(12) United States Patent
Stern et al.

(10) Patent No.: US 7,716,802 B2
(45) Date of Patent: May 18, 2010

(54) METHOD FOR MACHINING USING SACRIFICIAL SUPPORTS

(75) Inventors: Eric J. Stern, Valmeyer, IL (US); Amy M. Helvey, Imperial, MO (US); Christopher H. Swallow, St. Louis, MO (US)

(73) Assignee: The Boeing Company, Chicago, IL (US)

(*) Notice: Subject to any disclaimer, the term of this patent is extended or adjusted under 35 U.S.C. 154(b) by 1172 days.

(21) Appl. No.: 11/324,462

(22) Filed: Jan. 3, 2006

(65) Prior Publication Data

US 2007/0151087 A1    Jul. 5, 2007

(51) Int. Cl.
*B23P 17/00* (2006.01)
(52) U.S. Cl. ...................................................... 29/423
(58) Field of Classification Search .................. 29/423, 29/438, 418, 557, 558; 219/121.6; 430/11
See application file for complete search history.

(56) References Cited

U.S. PATENT DOCUMENTS

| 5,658,698 | A | 8/1997 | Yagi et al. |
| 6,649,861 | B2 | 11/2003 | Duignan |
| 6,780,786 | B2 * | 8/2004 | Dougherty .................. 438/758 |
| 2005/0163917 | A1 | 7/2005 | Renn |

* cited by examiner

*Primary Examiner*—John C Hong
(74) *Attorney, Agent, or Firm*—Klintworth & Rozenblat IP LLC

(57) ABSTRACT

The present application is directed to a process for forming a machined part. The process comprises providing a substrate and depositing a rough part on the substrate. One or more sacrificial supports are deposited adjacent to the rough part on the substrate. All or a portion of the one or more sacrificial supports and a portion of the rough part are removed. Additional embodiments are directed to aircraft part assemblies, and aircraft parts made by the above process.

28 Claims, 4 Drawing Sheets

METHOD FOR MACHINING USING SACRIFICIAL SUPPORTS

BACKGROUND

The present application relates to fabricating machined parts, and more particularly, to fabricating machined parts using sacrificial supports.

Machined parts are employed, for example, in airplane manufacturing, automobile manufacturing, and a wide variety of other industries. When machining parts, a cutting tool is often used to remove material from a rough part or block of stock material. The cutting tool may cause the part to vibrate during the cutting process. This vibration can reduce the accuracy of the cut, leave vibration marks on the part due to variations in cut depth, and even cause the part to break or otherwise be damaged.

Cutting tool vibration has been controlled using special cutting tool geometries and/or machining techniques designed to reduce vibration. For example, in certain machining techniques, small amounts of material may be removed at a slow rate using multiple cuts in order to avoid vibration. In one such technique, referred to herein as water-line machining, a part comprising, for example, a thin wall having two major side surfaces, may be machined by successively removing small portions of a rough part, beginning at the top of the rough part and working down. A first cut removes a strip of material to a desired depth from the top of one side of the rough part, and then a second cut removes a strip of material to the same depth from the top of the opposing side of the rough part. Successive cuts are made, first removing material from one side and then the other, down the rough part until the entire part is machined to form the thin wall.

However, as parts become thinner, they tend to become less rigid. This may result in a decrease in both the amount of material that can be removed with each cut, and the rate at which each cut can be made, in order to maintain vibrations of the part to an acceptable level during the machining process. Consequently, machining processes for thin parts may be time consuming and costly, and may still cause unacceptable vibrations for very thin parts.

BRIEF DESCRIPTION

One or more of the above-mentioned drawbacks associated with the machining processes discussed above may be addressed by embodiments of the present application, which will be understood by reading and studying the following specification.

One embodiment of the present application is directed to a process for forming a machined part. The process comprises providing a substrate and depositing a rough part and one or more sacrificial supports adjacent to the rough part on the substrate. All or a portion of the one or more sacrificial supports and a portion of the rough part are removed.

Another embodiment of the present application is directed to an aircraft part assembly. The assembly comprises a substrate, a rough part and one or more sacrificial supports on the substrate, the sacrificial supports being attached to the rough part.

Another embodiment of the present application is directed to an aircraft part made by a machining process. The process comprises providing a substrate and depositing a rough part and one or more sacrificial supports adjacent to the rough part on the substrate. All or a portion of the one or more sacrificial supports and a portion of the rough part are removed.

The details of one or more embodiments of the present application are set forth in the accompanying drawings and the description below. The features, functions, and advantages can be achieved independently in various embodiments of the present application, or may be combined in yet other embodiments.

DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
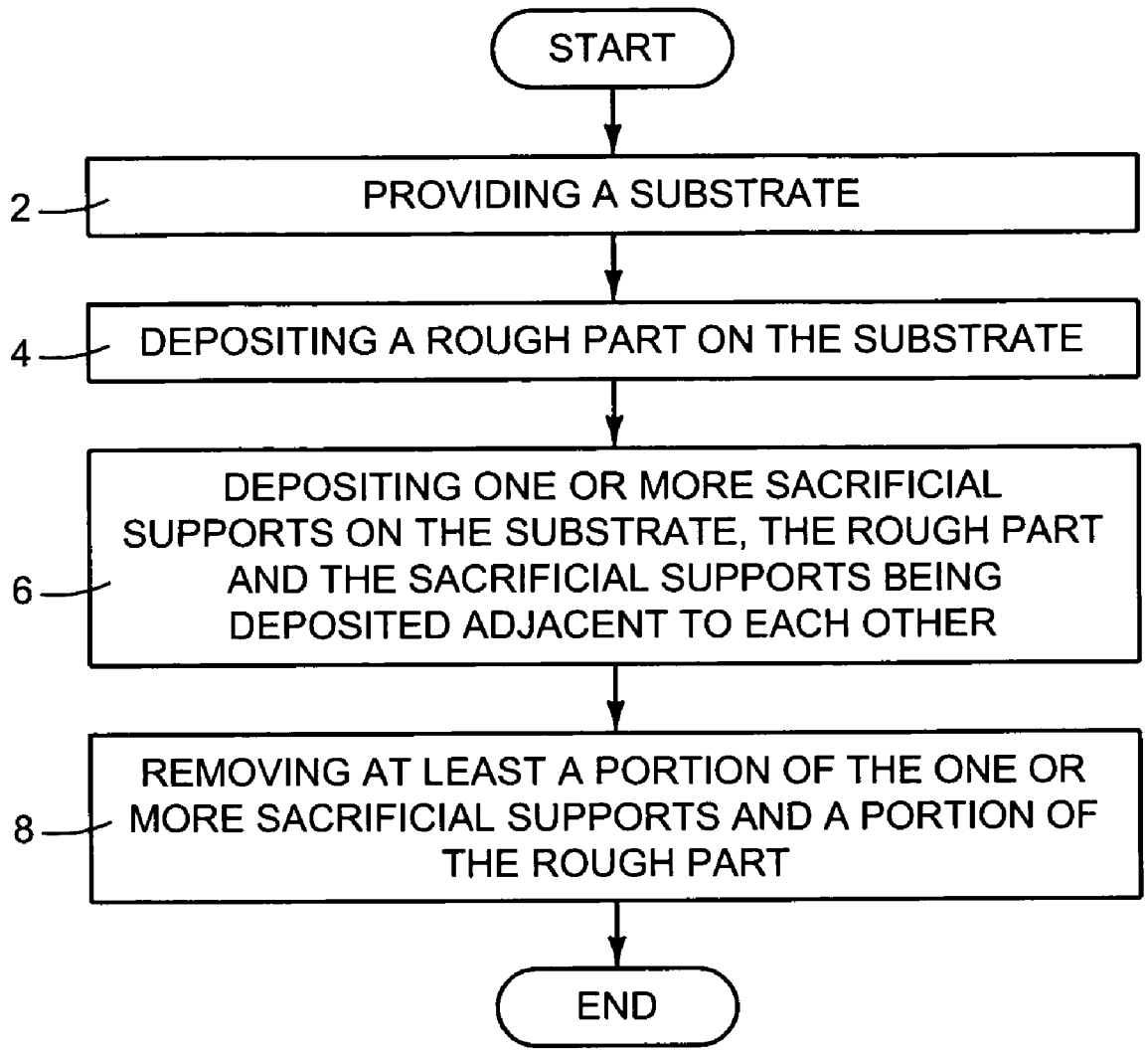
FIG. 1 illustrates a flow chart of a process for machining a part using sacrificial supports, according to one embodiment of the present application.

FIG. 1 illustrates a flow chart showing a process for machining parts, according to one embodiment of the present application. As illustrated in blocks 2 and 4 of FIG. 1, the process of the FIG. 1 embodiment comprises providing a substrate and then depositing a rough part on the substrate. One or more sacrificial supports are deposited on the substrate, as illustrated in block 6. Generally speaking, the sacrificial supports function to add rigidity to the rough part in order to reduce vibrations of the part during the subsequent removing process set forth in block 8.

As will be discussed in greater detail below, the rough part and the sacrificial supports may be deposited at the same time or different times, using the same or different methods. For example, in one embodiment, the rough part and sacrificial supports may be deposited simultaneously using the same deposition method. In other embodiments, the sacrificial supports may be deposited on the substrate either before or after the rough part using a different deposition method than the method used to deposit the rough part.

After the rough part and sacrificial supports are deposited, at least a portion of the one or more sacrificial supports and a portion of the rough part are removed, as shown in block 8 of the embodiment of FIG. 1. The removing process may be carried out using any suitable machining process, which will provide the desired reduced vibration of the rough part, given the enhanced rigidity provided by the sacrificial supports. Examples of such removing processes will be discussed in greater detail below.

Figure 2A:
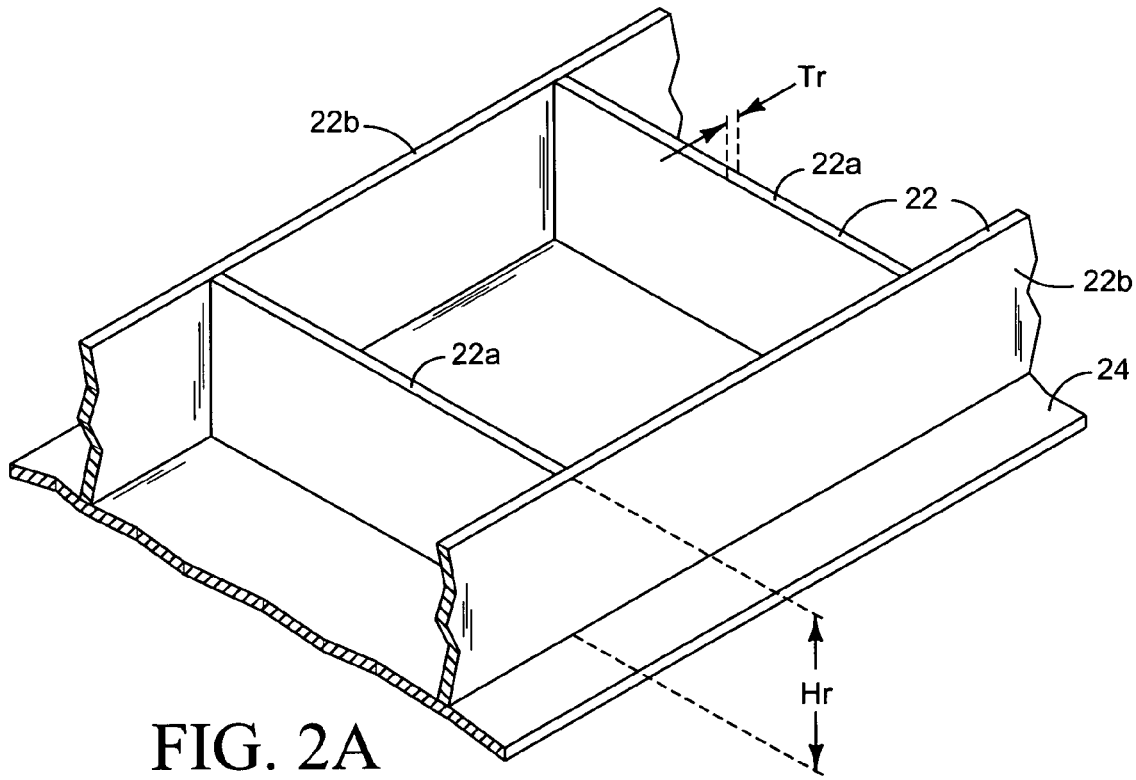
FIGS. 2A to 2D illustrate a process for machining an aircraft part using sacrificial supports, according to one embodiment of the present application.
Figure 2B:
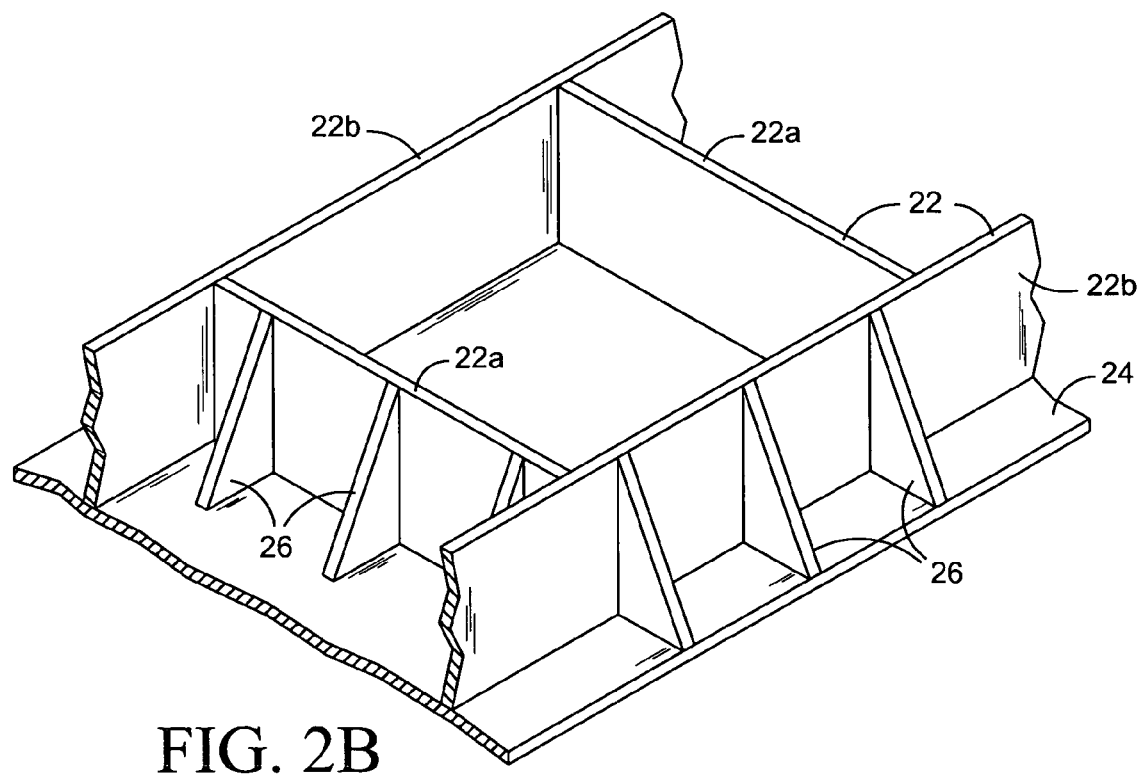
Figure 2C:
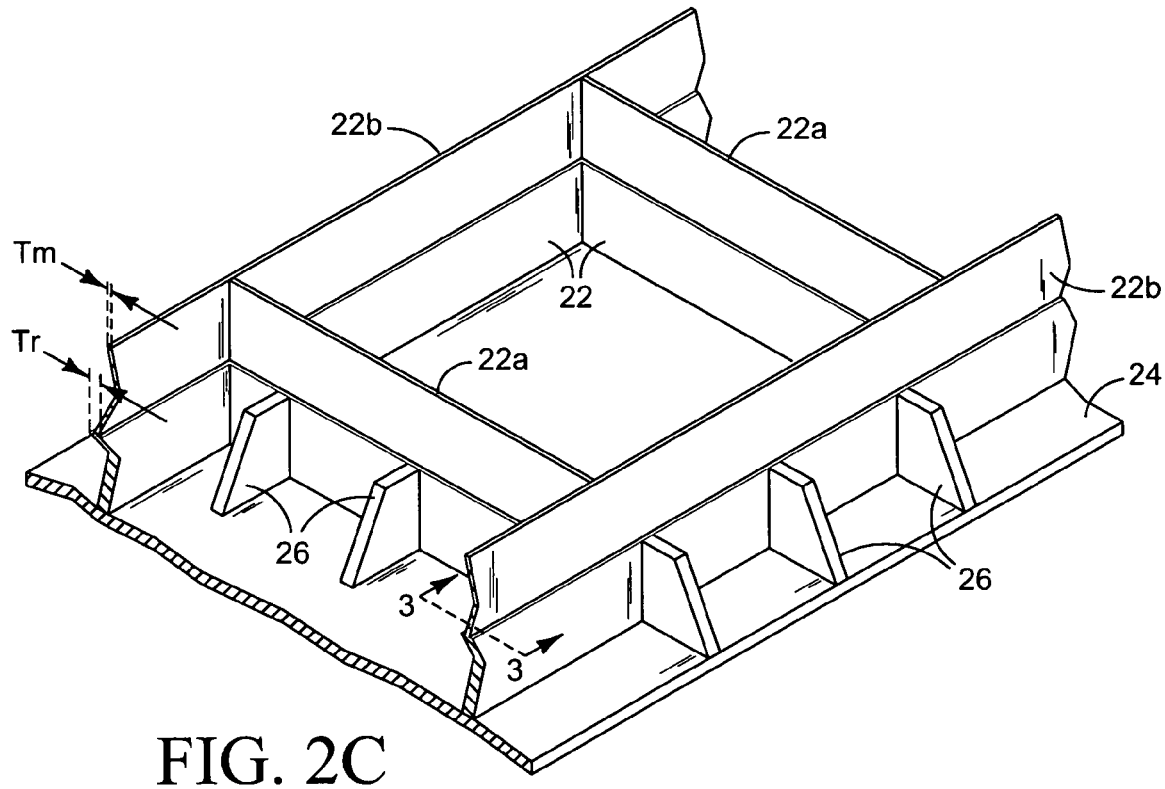
Figure 2D:
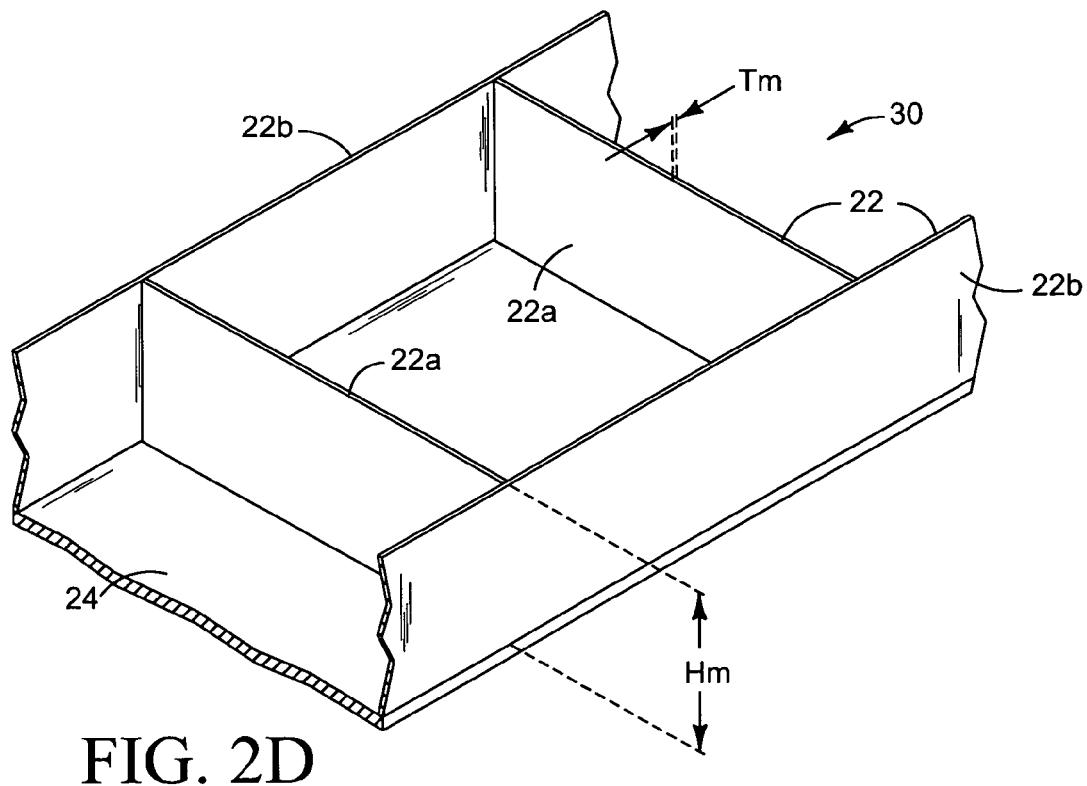

FIGS. 2A to 2D illustrate a machining process according to one embodiment of the present application. Finished part 30, illustrated in FIG. 2D, is a portion of a rib of an aircraft. However, the methods of the present application may be used to form any desired machined parts, as will be discussed in greater detail below.

In FIG. 2A, a rough part 22 is shown attached to a substrate 24. Substrate 24 may have any desired shape and size, and may be formed of any suitable material. Examples of substrate materials include metals, such as, for example, titanium, titanium alloys, aluminum, aluminum alloys, and steel. For example, in one embodiment, the material may comprise a titanium/aluminum/vanadium alloy, such as $TiAl_6V_4$. A wide variety of other materials may be employed, as would be understood by one of ordinary skill in the art. In certain embodiments, substrate 24, or a portion thereof, may form part of the final machined part, in which case the desired shape, size, and material of substrate 24 may be chosen accordingly.

In the illustrated embodiment, rough part 22 comprises a number of rectangular shaped support members 22a positioned between sidewalls 22b. Support members 22a and sidewalls 22b are illustrated as having the same uniform thickness, $T_r$, and the same uniform height, $H_r$. However, the thicknesses and heights of support members 22a and sidewalls 22b need not be uniform, and may vary in any desired manner.

In the embodiment shown in FIG. 2A, thickness, $T_r$, may be any suitable thickness, which will provide acceptable structural stability of the part during the machining process. Thickness, $T_r$, may vary depending on the particular machining process used, the type of material being machined and the dimensions of the part, including height $H_r$. For example, in certain embodiments, $T_r$ may range from about 0.25 inch to about 2 inches. In other embodiments, $T_r$ may range from about 0.7 inch to about 1.25 inches.

Height, $H_r$, may be chosen to be any desired height, depending on the desired height of the finished machined part and the structural stability of the part during machining. In certain embodiments, $H_r$ may be about 5 inches or more. In other embodiments, $H_r$ may range from about 6 inches to about 15 inches, and any height in between. In other embodiments, $H_r$ may range from about 7 inches to about 10 inches.

In certain embodiments, the shape of rough part 22 may be similar to the desired final shape of the machined part. For example, as seen in the illustrated embodiment, rough part 22 of FIG. 2A is similar to finished part 30 of FIG. 2D, except that thickness, $T_r$, of rough part 22 is greater than thickness, $T_m$, of machined part 30, as will be discussed in greater detail below. Generally speaking, the more similar the shape of rough part 22 compared to the final shape of machined part 30, the less material that will be required to be removed during the machining process.

In other embodiments, rough part 22 may have any desired shape capable of being formed into the desired machined part. For example, in one embodiment, rough part 22 may comprise a solid block of material having any suitable shape.

Rough part 22 may be formed by any suitable process. In one embodiment, rough part 22 is formed simultaneously as it is deposited onto substrate 24 using a process such as, for example, laser additive manufacturing (LAM) or electron beam deposition, both of which are well known in the art. In other embodiments, rough part 22 may be formed by cutting or otherwise shaping preformed stock material in any suitable manner, and then depositing the preformed stock material on the substrate 24.

Rough part 22 may comprise any suitable material, which is capable of being machined to form the desired part. Examples of suitable materials include metals, such as, for example titanium, titanium alloys, aluminum, aluminum alloys, and steel. For example, in one embodiment, the material may be a titanium/aluminum/vanadium alloy, such as $TiAl_6V_4$. A wide variety of other materials may be employed, as would be understood by one of ordinary skill in the art.

The material used for rough part 22 may be the same or different than that of substrate 24. For example, in one embodiment, both rough part 22 and substrate 24 may comprise a titanium alloy. In another embodiment, rough part 22 may comprise a titanium/aluminum/vanadium alloy, and substrate 24 may comprise a different material to which the titanium alloy is capable of being bonded, such as aluminum.

FIG. 2B illustrates one or more sacrificial supports 26 attached to substrate 24 and rough part 22. As mentioned above, sacrificial supports 26 functions to add rigidity to rough part 22. In one embodiment, the one or more sacrificial supports 26 are attached so as to provide sufficient rigidity to rough part 22 so that vibration of the rough part 22 is substantially reduced during machining, as compared with the vibration, which would occur if the sacrificial supports 26 were not employed.

As will be discussed in greater detail below, sacrificial supports 26 may have any suitable shape which will provide the desired degree of rigidity to rough part 22. In one embodiment the supports 26 are in the shape of a triangle, which may provide a high amount of rigidity for the relative amount of sacrificial material employed. In other embodiments, sacrificial supports 26 may be in the shape of a square, rectangle, or other suitable shape.

Sacrificial supports 26 may be formed and deposited on rough part 22 by any suitable method. In one embodiment, sacrificial supports 26 are formed by cutting or otherwise machining the parts from stock material and then depositing sacrificial supports 26 on substrate 24 adjacent to rough part 22. The deposition process may include attaching sacrificial supports 26 to substrate 24 and rough part 22 by, for example, conventional bonding or welding techniques, such as linear friction welding. In another embodiment, the sacrificial supports 26 may be simultaneously formed and deposited with rough part 22 by processes, such as, for example, laser additive manufacturing and electron beam deposition, both of which are well known in the art, as described above. In one embodiment, both rough part 22 and sacrificial supports 26 are simultaneously formed and deposited by the same process.

Sacrificial supports 26 may comprise any suitable material, which is capable of being machined and which will provide the desired rigidity to the rough part 22. Examples of materials include metals, such as, for example titanium, titanium alloys, aluminum, aluminum alloys, and steel. For example, in one embodiment, the material may be a titanium/aluminum/vanadium alloy, such as $TiAl_6V_4$. A wide variety of other materials may be employed, as would be understood by one of ordinary skill in the art.

The material used for sacrificial supports 26 may be the same or different than that of either rough part 22 or substrate 24. In one embodiment, sacrificial supports 26, rough part 22 and substrate 24 may all comprise a titanium alloy, such as $TiAl_6V_4$.

The number and dimensions of sacrificial supports 26 may vary in order to provide the desired rigidity to the structure. For example, rather than employing multiple, relatively narrow sacrificial supports 26 as illustrated in FIG. 2B, a single, wider sacrificial support could potentially be employed. In addition, positioning of the sacrificial supports 26 may vary to provide the desired rigidity. For example, in one embodiment, sacrificial supports 26 may be positioned against the inside portions of sidewalls 22b, rather than the outside portions as in the illustrated embodiment. In another embodiment, sacrificial supports 26 may be positioned on both sides of sidewalls 22b and/or support members 22a.

As described above, after rough part 22 and sacrificial supports 26 are formed, at least a portion of the one or more sacrificial supports 26 and a portion of rough part 22 are removed to form a machined part 30, illustrated in FIG. 2D. The removing process may be any suitable process, which will provide the desired reduced vibration of rough part 22, given the enhanced rigidity provided by sacrificial supports 26.

Figure 3:
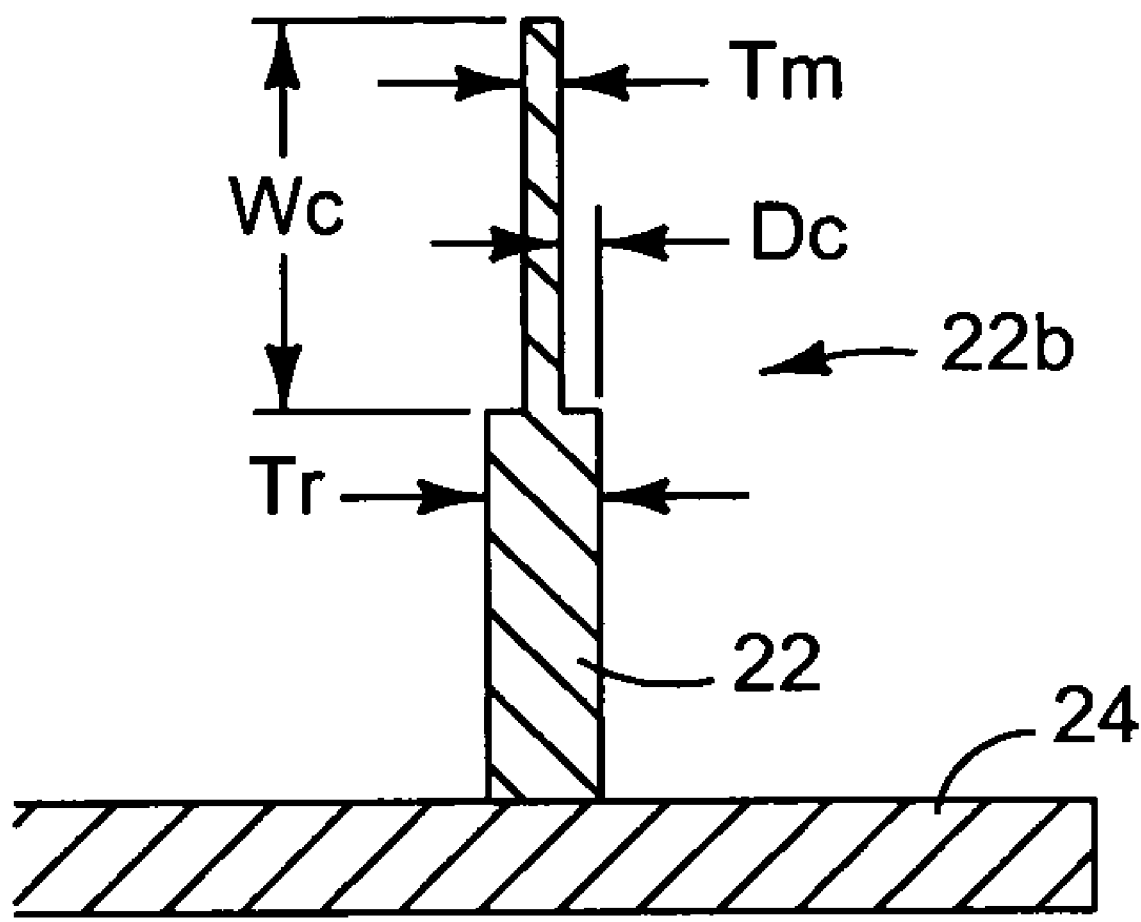
FIG. 3 illustrates a cross-sectional view of the embodiment illustrated in FIG. 2C.

In one embodiment, the removing process may comprise successively removing small portions of rough part 22, such as by a water-line machining technique. FIGS. 2C and 3 illustrate one such embodiment, FIG. 3 being a cross-section of FIG. 2C, as indicated in the drawings. During the illustrated process, a number of successive horizontal cuts are made with a cutting tool (not shown) beginning at the top of rough part 22, in order to form a thin region of rough part 22 having a thickness $T_m$, as shown in FIG. 3. A first cut removes a strip of material to a desired depth from the top of one surface of sidewalls 22b and/or support members 22a, followed by a cut to remove a strip of material to the same depth from the top of the opposing surface of sidewalls 22b and/or support members 22a. For example, in one embodiment, two cuts are made to form the thin region of sidewall 22b in FIG. 3; one cut having a width, $W_c$, and depth, $D_c$ on either side of rough part 22. Additional cuts are then made, first removing material from one side of rough part 22 and then the other side, down rough part 22. This process is repeated until the entire part is machined to form finished machined part 30, as illustrated in FIG. 2D.

The depth, $D_c$, and width, $W_c$, of each cut may be adjusted as desired. In certain embodiments, the amount of material removed with each cut may depend, at least in part, on the rigidity of the rough part 22 being machined. In such embodiments, the use of sacrificial supports 26 may increase the rigidity of rough part 22, and thereby allow more material to be removed with each cut, as compared with the same rough part 22 where no sacrificial supports 26 are used. In one embodiment, $D_c$ may range from about 0.05 inch to about 1 inch, or more, and Wc may range from about 0.05 inch to about 1 inch. In another embodiment, $D_c$ may range from about 0.25 inch to about 0.5 inch, and $W_c$ may range from about 0.1 inch to about 0.5 inch.

As material is removed from rough part 22, it may be simultaneously removed from the sacrificial supports 26, as shown in the embodiment of FIG. 2C. In alternative embodiments, all or a desired portion of the material to be removed from rough part 22 could be removed prior to removing sacrificial supports 26.

In the illustrated embodiment, all of the sacrificial supports 26 are removed. In other embodiments, a portion of the one or more sacrificial supports 26 are removed during the machining process, so that at least a portion of the one or more sacrificial supports 26 remain in whole or in part after the removing process is complete.

After rough part 22 is machined, all or a portion of substrate 24 may be removed. For example, as illustrated in FIG. 2D, the portion of substrate 24 outside of the periphery of rough part 22 is removed. In other embodiments, substrate 24 may remain in its entirety as part of finished machined part 30.

The processes of the present application may be used to form any desired part which may benefit from enhanced rigidity provided by the sacrificial supports 26 during machining, including, for example, parts which comprise relatively tall and/or thin portions, such as the illustrated structure of the FIG. 2D embodiment. The FIG. 2D structure may be, for example, a portion of the rib of an aircraft, or other support structure. Specific examples of such aircraft structures include pylon ribs, pylon handles, and side frames.

The thickness, $T_m$, of machined part 30 illustrated in the embodiment of FIG. 2D may be any desired thickness which will provide acceptable structural stability of the part during the machining process. Thickness, $T_m$, may vary depending on the particular machining process used, the type of material being machined and the dimensions of the part, including height, $H_m$. For example, in certain embodiments, $T_m$ may be less than about 0.1 inch, such as for example, from about 0.01 inch to 0.05 inch. Further, the thicknesses of support members 22a may be the same as, or different than, the thicknesses of sidewalls 22b.

The height, $H_m$, of machined part 30 may be any desired height, although $H_m$ may be limited by the structural stability of machined part 30. In one embodiment, $H_m$ may be about 5 inches or more. In other embodiments, $H_m$ may range from about 6 inches to about 15 inches, or any height there between. In yet other embodiments, $H_m$ may range from about 7 inches to about 10 inches.

In certain embodiments, employing sacrificial supports 26 according to the processes of the present application may allow parts to be routinely machined which have an increased height, $H_m$, for a given thickness, $T_m$, compared to the height of parts capable of being routinely machined using the same processes without sacrificial supports 26. In certain embodiments, the ratio of $H_m$ to $T_m$ of such parts may be greater than, for example, about 50:1. For example, the ratio of $H_m$ to $T_m$ may range from about 80:1 to about 800:1. In other embodiments, the ratio of $H_m$ to $T_m$ may range from about 200:1 to about 400:1.

In the illustrated embodiment of FIG. 2D, $H_m$ is equal to the height, $H_r$, of rough part 22. In other embodiments, rough part 22 may be machined so that $H_m$ is not equal to $H_r$. Also in the illustrated embodiment, the height of support members 22a are shown as being the same as the height of sidewalls 22b, while in other embodiments, the height of support members 22a may be different than the height of sidewalls 22b.

In some embodiments, machined part 30 may have a reduced number of vibration marks as compared with the same machined part made using the same process, which does not employ sacrificial supports. As discussed above, vibration marks can be caused by variations in cut depth due to vibration of the part during machining. In certain embodiments, the vibration marks may be entirely prevented, while in other embodiments, vibration marks may be formed on the finished part 30, depending on the degree to which the sacrificial supports 26 reduce vibration.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A process for forming a machined part, comprising
providing a substrate;
depositing a rough part over and on the substrate;
depositing one or more sacrificial supports over and on the substrate, the rough part and the one or more sacrificial supports being deposited adjacent to each other over and on the substrate; and
removing all or a portion of the one or more sacrificial supports and a portion of the rough part.

2. The process of claim 1, wherein the rough part comprises at least one metal chosen from titanium, titanium alloys, aluminum, aluminum alloys and steel.

3. The process of claim 1, wherein the rough part is deposited by a method chosen from laser additive manufacturing and electron beam deposition.

4. The process of claim 1, wherein the rough part comprises a titanium/aluminum/vanadium alloy and is deposited by laser additive manufacturing.

5. The process of claim 1, wherein the rough part is deposited to a height of about 5 inches or more.

6. The process of claim 1, wherein all of the sacrificial supports are removed.

7. The process of claim 1, wherein the one or more sacrificial supports comprise at least one metal chosen from titanium, titanium alloys, aluminum, aluminum alloys and steel.

8. The process of claim 1, wherein the one or more sacrificial supports are attached to the rough part after the rough part is deposited.

9. The process of claim 1, wherein both the rough part and the one or more sacrificial supports are formed simultaneously by a deposition process chosen from laser additive manufacturing and electron beam deposition.

10. The process of claim 1, wherein the one or more sacrificial supports are in the shape of a triangle.

11. The process of claim 1, wherein the one or more sacrificial supports are deposited so as to provide sufficient rigidity to the rough part so that vibration of the rough part is substantially reduced during the removing of at least a portion of the one or more sacrificial supports and a portion of the rough part, as compared with vibration which would occur if the sacrificial supports were not employed.

12. The process of claim 1, wherein removing the sacrificial supports and the portion of the rough part is performed by at least one of a machining technique and a water-line machining technique to form the machined part comprising the rough part.

13. The process of claim 1, wherein the depositing the rough part over and on the substrate comprises depositing a thickness of the rough part to extend horizontally over and against the substrate and depositing a height of the rough part to extend vertically over the substrate, wherein the height is greater than the thickness.

14. The process of claim 13, wherein the ratio of the height to the thickness is at least 50:1.

15. The process of claim 1, wherein the removing comprises at least one of: (1) simultaneously removing all or the portion of the one or more sacrificial supports while removing the portion of the rough part; and (2) removing the portion of the rough part prior to removing all or the portion of the one or more sacrificial supports.

16. The process of claim 1, wherein the removing comprises alternating between cutting one side of the rough part to remove a portion of the rough part, and cutting an opposing side of the rough part to remove another portion of the rough part.

17. The process of claim 16, wherein the removing comprises making successive horizontal cuts with a cutting tool by alternating between cutting the one side of the rough part to remove the portion of the rough part, and cutting the opposing side of the rough part to remove the another portion of the rough part.

18. The process of claim 17, wherein the removing comprises cutting the one side of the rough part beginning at a top of the rough part towards a bottom of the rough part to remove the portion of the rough part, and then cutting the opposing side of the rough part beginning from the top of the rough part towards the bottom of the rough part to remove the another portion of the rough part.

19. A process for forming a machined part with reduced vibration, comprising
    providing a substrate;
    depositing a rough part over and on the substrate;
    depositing one or more sacrificial supports over and on the substrate, the rough part and the one or more sacrificial supports being deposited adjacent to each other over and on the substrate; and
    alternating between machining one side of the rough part to remove a portion of the rough part, and machining an opposing side of the rough part to remove another portion of the rough part.

20. The process of claim 19, wherein each of the depositing the rough part over and on the substrate and the depositing the one or more sacrificial supports over and on the substrate comprise at least one of cutting stock material followed by depositing the cut stock material over and on the substrate, bonding to over and on the substrate, welding to over and on the substrate, laser additive manufacturing over and on the substrate, and electron beam deposition over and on the substrate.

21. The process of claim 19, wherein the machining comprises making a horizontal cut in the rough part.

22. The process of claim 21, wherein the horizontal cut has a width in a range of 0.05 inches to about 1 inch, and a depth in a range of between 0.1 inches to about 0.5 inches.

23. The process of claim 19, wherein the machining further comprises at least one of: (1) simultaneously machining the one or more sacrificial supports and removing at least a portion of the one or more sacrificial supports; and (2) machining the rough part prior to machining the one or more sacrificial supports.

24. The process of claim 19, further comprising at least one of removing at least a portion of one of the one or more sacrificial supports and removing at least a portion of the substrate.

25. The process of claim 19, wherein the process forms the machined part having a height of 5 inches or more, a thickness of 0.05 inches or less, and a ratio of height to thickness of greater than 50 to 1.

26. The process of claim 19 wherein the process forms the machined part comprising at least one of an aircraft part and an aircraft rib.

27. The process of claim 19, wherein the depositing the rough part over and on the substrate comprises depositing a thickness of the rough part to extend horizontally over and against the substrate and depositing a height of the rough part to extend vertically over the substrate, wherein the height is greater than the thickness.

28. A process for forming an aircraft part made by a machining process with reduced vibration, comprising
    providing a substrate;
    depositing a rough part over and on the substrate;
    depositing one or more sacrificial supports over and on the substrate adjacent to the rough part disposed over and on the substrate;
    alternating between machining one side of the rough part to remove a portion of the rough part, and machining an opposing side of the rough part to remove another portion of the rough part; and
    removing at least a portion of one of the one or more sacrificial supports and removing at least a portion of the substrate;
    wherein the process forms an aircraft part having a ratio of height to thickness of greater than 50 to 1.

* * * * *